(12) United States Patent
Yan et al.

(10) Patent No.: US 11,515,068 B2
(45) Date of Patent: Nov. 29, 2022

(54) EXCITER

(71) Applicant: AAC Technologies Pte. Ltd., Singapore (SG)

(72) Inventors: Xudong Yan, Shenzhen (CN); Wenya Han, Shenzhen (CN); Wei Liu, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 155 days.

(21) Appl. No.: 16/994,704

(22) Filed: Aug. 17, 2020

(65) Prior Publication Data

US 2021/0005370 A1   Jan. 7, 2021

Related U.S. Application Data

(63) Continuation of application No. PCT/CN2019/094871, filed on Jul. 5, 2019.

(51) Int. Cl.
| | | |
|---|---|---|
| *H01F 7/08* | (2006.01) | |
| *H01F 7/16* | (2006.01) | |
| *H01F 27/28* | (2006.01) | |
| *H01F 27/24* | (2006.01) | |
| *H04M 1/03* | (2006.01) | |

(52) U.S. Cl.
CPC ............... *H01F 7/16* (2013.01); *H01F 7/081* (2013.01); *H01F 27/24* (2013.01); *H01F 27/28* (2013.01); *H01F 2007/086* (2013.01); *H04M 1/035* (2013.01)

(58) Field of Classification Search
CPC . H01F 7/16; H01F 7/081; H01F 27/24; H01F 27/28; H01F 2007/086; H01F 7/1646; H04M 1/035; B06B 1/045; H02K 5/04; H02K 33/00; H02K 33/02; H02K 33/16; H02K 1/34
USPC .......................................................... 335/279
See application file for complete search history.

(56) References Cited

U.S. PATENT DOCUMENTS

| | | | | |
|---|---|---|---|---|
| 1,723,111 | A * | 8/1929 | Witzel | H02K 19/30 310/112 |
| 4,192,230 | A * | 3/1980 | Blom | B41J 9/38 400/124.21 |
| 5,396,563 | A * | 3/1995 | Yoshimi | H04R 1/1016 381/372 |

(Continued)

*Primary Examiner* — Shawki S Ismail
*Assistant Examiner* — Lisa N Homza
(74) *Attorney, Agent, or Firm* — W&G Law Group (57) ABSTRACT

An exciter includes a first yoke having a first accommodation space with a first open end, a second yoke having a second accommodation space with a second open end which faces the first open end, the second open end being spaced from the first open end in a vibration direction. The exciter further includes a first magnetic member accommodated in the first accommodation space, a magnetic core and a coil accommodated in the second accommodation space, the coil wound around the magnetic core, a second magnetic member accommodated in the second accommodation space and located at outside of the coil, and a copper tube wound around the magnetic core and sandwiched between the magnetic core and the coil. The copper tube is capable of suppressing the high frequency impedance of the coil and therefore improves the high frequency performance and the reliability of the exciter.

12 Claims, 7 Drawing Sheets

(56) References Cited

U.S. PATENT DOCUMENTS

| | | | | |
|---|---|---|---|---|
| 5,619,103 A * | 4/1997 | Tobin | ............. | H01J 65/048 |
| | | | | 315/111.21 |
| 5,877,569 A * | 3/1999 | Heinrich | ............. | H02K 23/66 |
| | | | | 335/250 |
| 5,949,315 A * | 9/1999 | Kalb | ............. | H01H 51/2209 |
| | | | | 335/229 |
| 6,511,042 B1 * | 1/2003 | Schulz | ............. | F02M 25/0836 |
| | | | | 251/129.21 |
| 9,871,432 B2 * | 1/2018 | Mao | ............. | H02K 33/16 |
| 10,008,894 B2 * | 6/2018 | Mao | ............. | H02K 1/34 |
| 10,220,412 B2 * | 3/2019 | Mao | ............. | B06B 1/045 |
| 10,447,129 B2 * | 10/2019 | Mao | ............. | H02K 33/00 |
| 10,447,131 B2 * | 10/2019 | Mao | ............. | H02K 33/16 |
| 10,644,554 B2 * | 5/2020 | Huang | ............. | B06B 1/045 |
| 2004/0028254 A1 * | 2/2004 | Bachmann | ............. | H04R 11/02 |
| | | | | 381/412 |
| 2009/0267423 A1 * | 10/2009 | Kajiwara | ............. | H02K 33/02 |
| | | | | 310/38 |
| 2012/0170795 A1 * | 7/2012 | Sancisi | ............. | H04R 9/043 |
| | | | | 381/412 |
| 2014/0079253 A1 * | 3/2014 | Yan | ............. | H04R 7/16 |
| | | | | 181/171 |
| 2014/0247960 A1 * | 9/2014 | Liu | ............. | H04R 7/20 |
| | | | | 381/400 |
| 2015/0030198 A1 * | 1/2015 | Xu | ............. | B06B 1/04 |
| | | | | 381/386 |
| 2015/0086066 A1 * | 3/2015 | Yan | ............. | H04R 9/025 |
| | | | | 381/412 |
| 2017/0117788 A1 * | 4/2017 | Hou | ............. | H02K 1/34 |
| 2017/0192194 A1 * | 7/2017 | Yan | ............. | G02B 7/08 |
| 2020/0165152 A1 * | 5/2020 | Dan | ............. | C03B 23/0302 |
| 2020/0280796 A1 * | 9/2020 | Lee | ............. | H04R 9/046 |
| 2021/0328491 A1 * | 10/2021 | Takahashi | ............. | B06B 1/045 |
| 2021/0352390 A1 * | 11/2021 | Lee | ............. | B60R 11/0223 |

* cited by examiner

EXCITER

FIELD OF THE INVENTION

The present disclosure relates to the field of exciters, and in particular to an exciter for screen sounding.

BACKGROUND

With the advent of the internet era, mobile electronic devices including mobile phones are becoming more and more popular. The functions of the mobile phones are very diverse, and one of them is the high-quality sounding function which is one of the key factors that people need to consider when buying mobile phones. At present, with the development of touch screen mobile phones, screen sounding devices are used in more and more smart phones. The smart phones apply screen sounding devices so that the users can hear high-quality sound when their ears contact anywhere of the screen. It is convenient for making and answering a call clearer. An exciter acting as a sound-generating device is a key component for realizing screen sounding. With the rapid application of the screen sounding technology, high-performance exciters are becoming more and more important.

However, in the exciters of the related art, in order to increase the utilization rate of the magnetic circuit, a magnet conductive iron core is usually provided inside a coil. However, the magnet conductive iron core makes the high frequency impedance of the coil increase sharply, which affects the performance of the exciter and decreases high-frequency radiation.

Therefore, it is desired to provide an improved exciter which can overcome at least one of the above problems.

SUMMARY

Accordingly, the present disclosure is directed to an exciter with improved high frequency performance.

The present disclosure provides an exciter which comprises a first yoke having a first accommodation space with a first open end, a second yoke having a second accommodation space with a second open end which faces the first open end, the second open end being spaced from the first open end in a vibration direction. The exciter further comprises a first magnetic member accommodated in the first accommodation space, a magnetic core and a coil accommodated in the second accommodation space, the coil wound around the magnetic core, a second magnetic member accommodated in the second accommodation space and located at outside of the coil, and a copper tube wound around the magnetic core and sandwiched between the magnetic core and the coil.

In some embodiments, the at least one second magnetic member comprises two second magnetic members respectively located at opposite sides of the coil symmetrically.

In some embodiments, the two second magnetic members are magnetized in the vibration direction, and magnetized directions of the two second magnetic members are reverse to each other.

In some embodiments, the first magnetic member and the at least one second magnetic member are magnetized in the vibration direction, and magnetized directions of the first magnetic member and the at least one second magnetic member are reverse to each other.

In some embodiments, the first magnetic member and the at least one second magnetic member are permanent magnets.

In some embodiments, a projection of the at least one second magnetic member in the vibration direction at least partially overlaps with a projection of the first magnetic member in the vibration direction.

In some embodiments, the first yoke comprises a first end wall and a first side wall extending from the first end wall toward the second yoke; and the second yoke comprises a second end wall and a second side wall extending from the second end wall toward the first yoke, the magnetic core being fixed to the second end wall.

In some embodiments, the exciter further comprises an elastic member connected and located between the first yoke and the second yoke in the vibration direction.

In some embodiments, the elastic member comprises a first end and a second end spaced from the first end in a direction perpendicular to the vibration direction, the first end being attached to the first side wall of the first yoke, the second end being attached to the second side wall of the second yoke.

In some embodiments, the first side wall is aligned with the second side wall with a gap in the vibration direction is formed between the first side wall and the second side wall such that the second open end is spaced from the first open end in the vibration direction In some embodiments, the elastic member is ring-shaped.

In some embodiments, the magnetic core is made of iron.

Compared with the related art, the exciter of the present disclosure applies a copper tube which is sleeved on the magnetic core and sandwiched between the magnetic core and the coil. The copper tube is capable of suppressing the high frequency impedance of the coil and therefore improves the high frequency performance and the reliability of the exciter.

BRIEF DESCRIPTION OF THE DRAWINGS

In order to explain the technical solutions of the embodiments of the present disclosure more clearly, accompanying drawings used to describe the embodiments are briefly introduced below. It is evident that the drawings in the following description are only concerned with some embodiments of the present disclosure. For those skilled in the art, in a case where no inventive effort is made, other drawings may be obtained based on these drawings.

DESCRIPTION OF THE EMBODIMENTS

The technical solutions in embodiments of the present disclosure will be clearly and completely described with reference to the accompanying drawings of the present disclosure. It is evident that the elements described are only some rather than all embodiments of the present disclosure. Based on the embodiments of the present disclosure, all other embodiments obtained by those skilled in the art without making any inventive effort fall into the protection scope of the present disclosure.

Embodiment 1

Referring to FIGS. 1 to 4, an exciter 100 in accordance with a first exemplary embodiment of the present disclosure comprises a first yoke 1 with a first accommodation space 10, a second yoke 2 with a second accommodation space 20, a first magnetic member 3 accommodated in the first accommodation space 10, a second magnetic member 4, a magnetic core 5, a coil 6 and a copper tube 7. The second magnetic member 4, the magnetic core 5, the coil 6 and the copper tube 7 are accommodated in the second accommodation space 20. The second yoke 2 and the first yoke 1 are spaced from each other in the vibration direction of the exciter 100. One of the second yoke 2 and the first yoke 1 may be fixed to a screen of a mobile phone for vibrating the screen in the vibration direction.

The first yoke 1 comprises a first end wall 11 and a first side wall 12 extending from the first end wall 11 toward the second yoke 2. The first end wall 11 and the first side wall 12 cooperatively form the first accommodation space 10 with an open end. For simplifying description, the open end of the first accommodation space 10 is defined as the first open end 14. The first open end 14 faces the second yoke 2 in vibration direction.

The second yoke 2 comprises a second end wall 21 and a second side wall 22 extending from the second end wall 21 toward the first yoke 1. The second end wall 21 and the second side wall 22 cooperatively form a second accommodation space 20 with an open end. For simplifying description, the open end of the second accommodation space 20 is defined as the second open end 24. The second open end 24 faces the first open end 14 in the vibration direction. Preferably, the central axis of the first accommodation space 10 is aligned with the central axis of the second accommodation space 20. A gap in the vibration direction is formed between the first side wall 12 and the second side wall 22 such that the second open end 24 is spaced from the first open end 14 in the vibration direction.

The first magnetic member 3 is fixed to the first end wall 11 and accommodated in the first accommodation space 10.

The magnetic core 5 is fixed to the second end wall 21 and accommodated in the second accommodation space 20. The magnetic core 5 is made of magnet conductive material. Preferably, the magnetic core 5 is made of iron.

The coil 6 is wound on the magnetic core 5. The magnetic core 5 made of magnet conductive material is capable of increasing the utilization rate of the magnet field significantly.

The second magnetic member 4 is arranged at the outside of the coil 6 with a gap formed therebetween. In this embodiment, the exciter applies two second magnetic member 4 which are located at opposite sides of the coil 6 symmetrically. Understandably, the number of the second magnetic members 4 is not limited to two. Other number of second magnetic member 4 can be arranged at the outside of the coil 6 symmetrically. Alternatively, the second magnetic member 4 can be a ring magnet.

The copper tube 7 is sleeved on the magnetic core 5 and sandwiched between the magnetic core 5 and the coil 6, which facilities to suppress the high frequency impedance of the coil 6 and improves the high frequency performance of the exciter 100.

In this embodiment, the first magnetic member 3 and the second magnetic member 4 are magnetized in the vibration direction, and the magnetized directions of the first magnetic member 3 and the second magnetic member 4 are reverse to each other. The magnetized directions of the second magnetic members 4 are the same.

The coil 6 defines an axial direction around which the coil 6 is wound. Preferably, the axial direction of the coil 6 is parallel to the vibration direction. When the coil 6 is not energized, attraction forces are generated between the first magnetic member 3 and the magnetic core 5 and the second yoke 2 while a repulsive force is generated between the first magnetic member 3 and the second magnetic member 4 due to the polarity of two adjacent ends of the first magnetic member 3 and the second magnetic member 4 are the same. The total of the attraction forces is equal to the repulsive force to thereby maintain the balance of the exciter 100. When the coil 6 is energized with alternating current, an electromagnetic force with variable directions is generated between the first magnetic member 3 and the coil 6 to thereby cause the exciter 100 to vibrate in the vibration direction. Preferably, the projection of the second magnetic member 4 in the vibration direction at least partially overlaps with the projection of the first magnetic member 3 in the vibration direction to increase the repulsive force between the first magnetic member 3 and the second magnetic member 4 in the vibration direction. Preferably, the first magnetic member 3 and the second magnetic member 4 both are permanent magnets.

Embodiment 2

Figure 1:
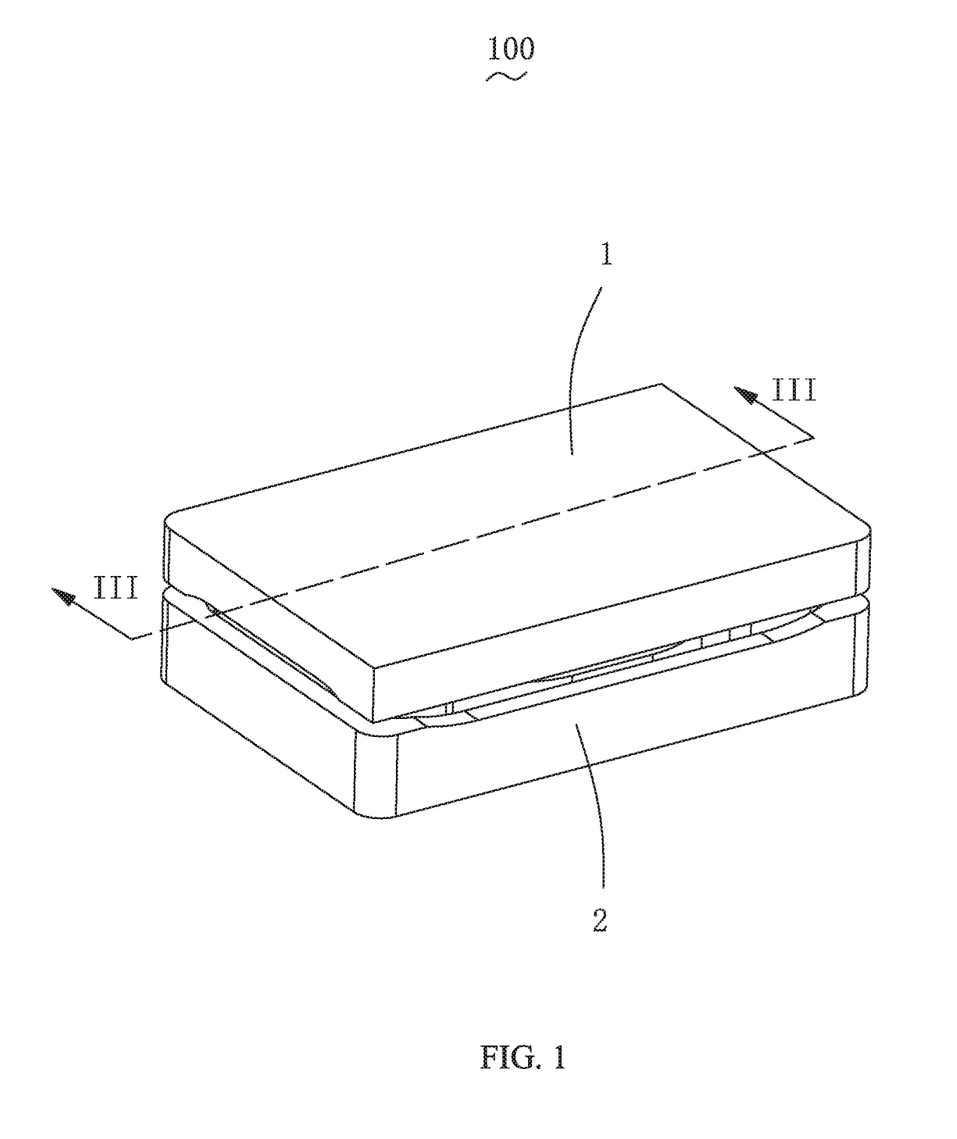
FIG. 1 is a schematic view of an exciter in accordance with a first exemplary embodiment of the present disclosure.
Figure 2:
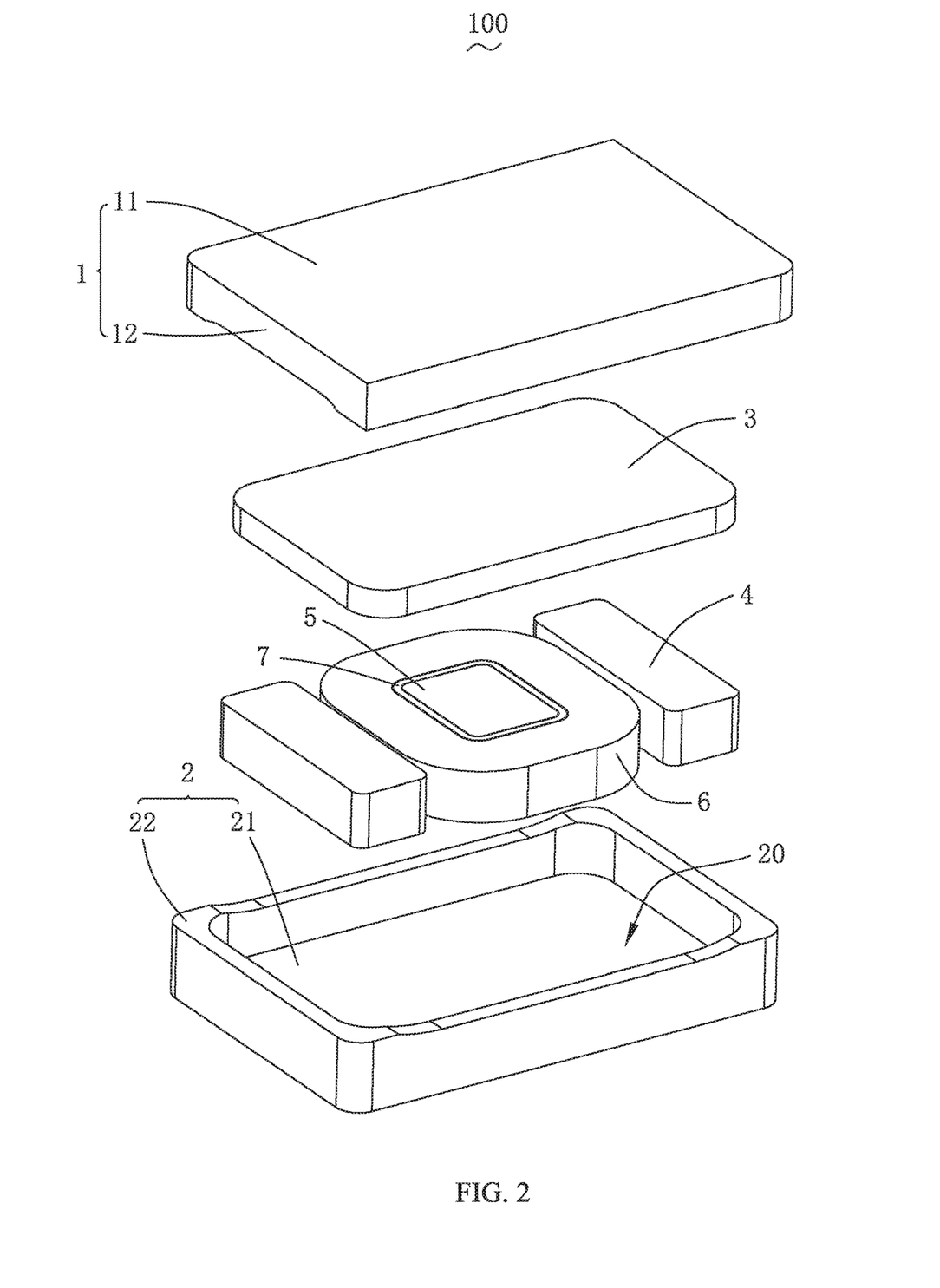
FIG. 2 is an exploded view of the exciter of FIG. 1.
Figure 3:
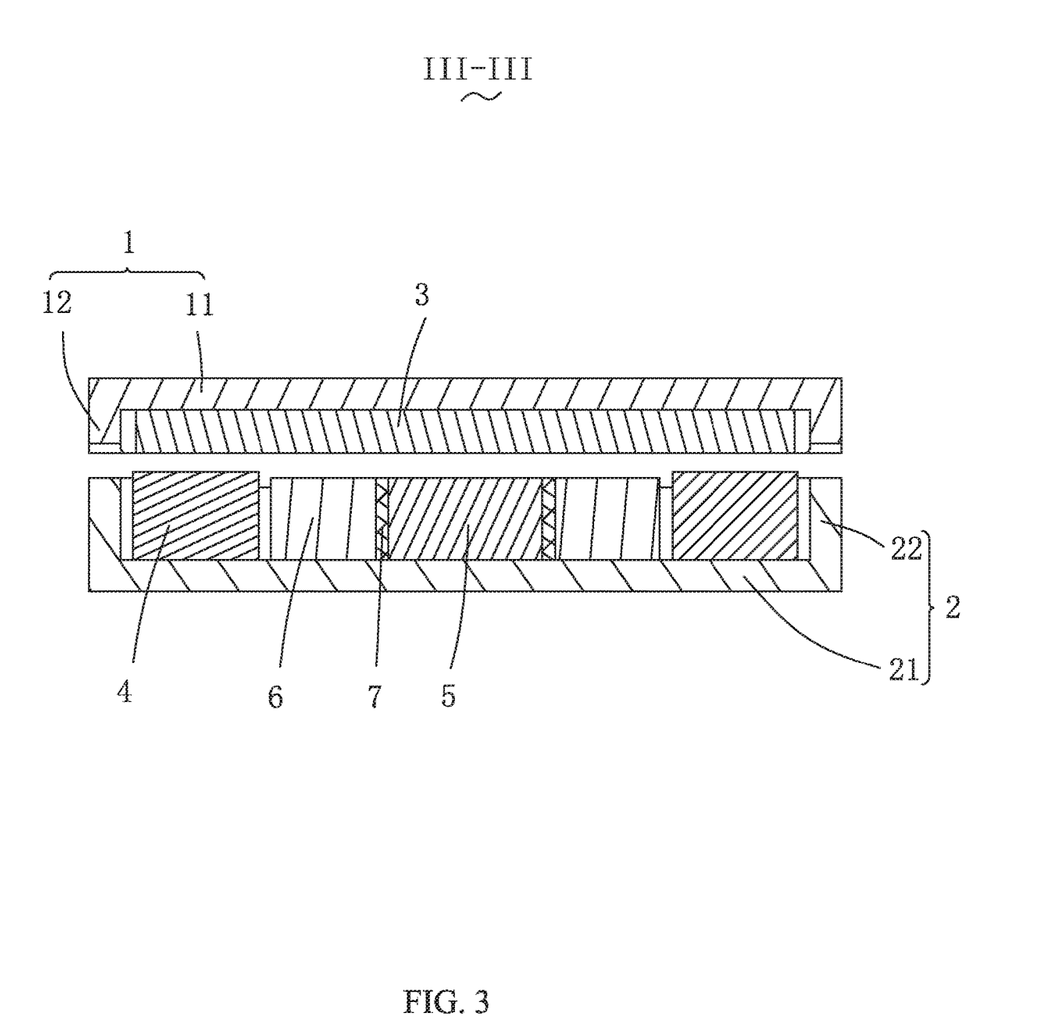
FIG. 3 is a cross-sectional view taken along line of FIG. 1.
Figure 4:
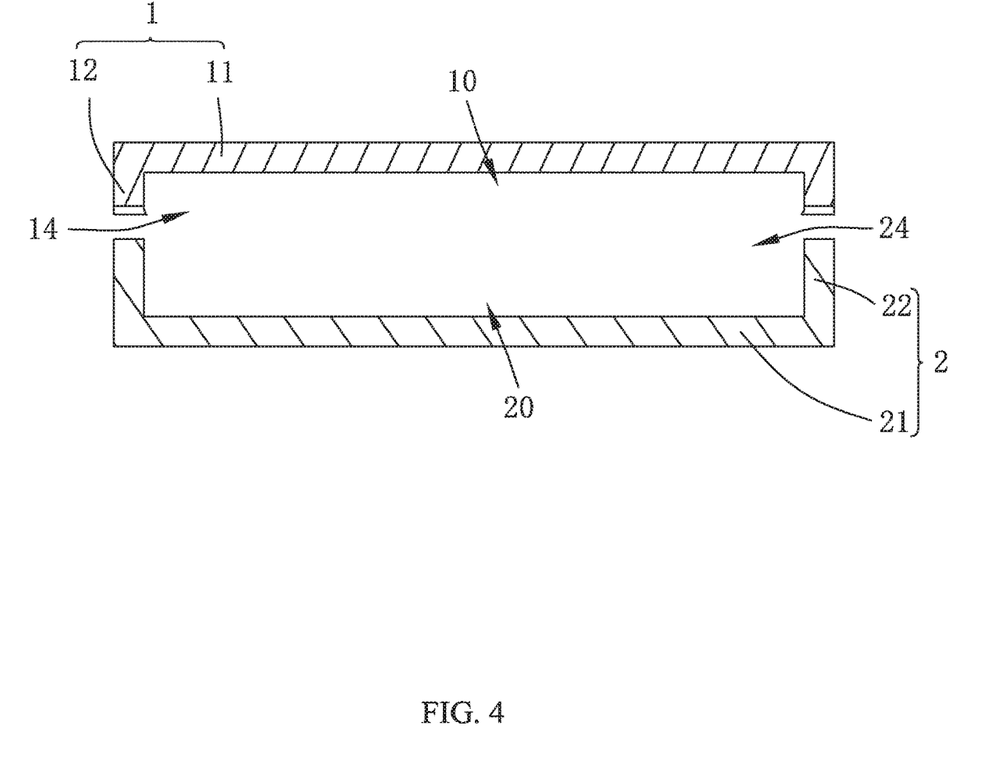
FIG. 4 is a cross-sectional view of a first yoke and a second yoke in FIG. 3.
Figure 5:
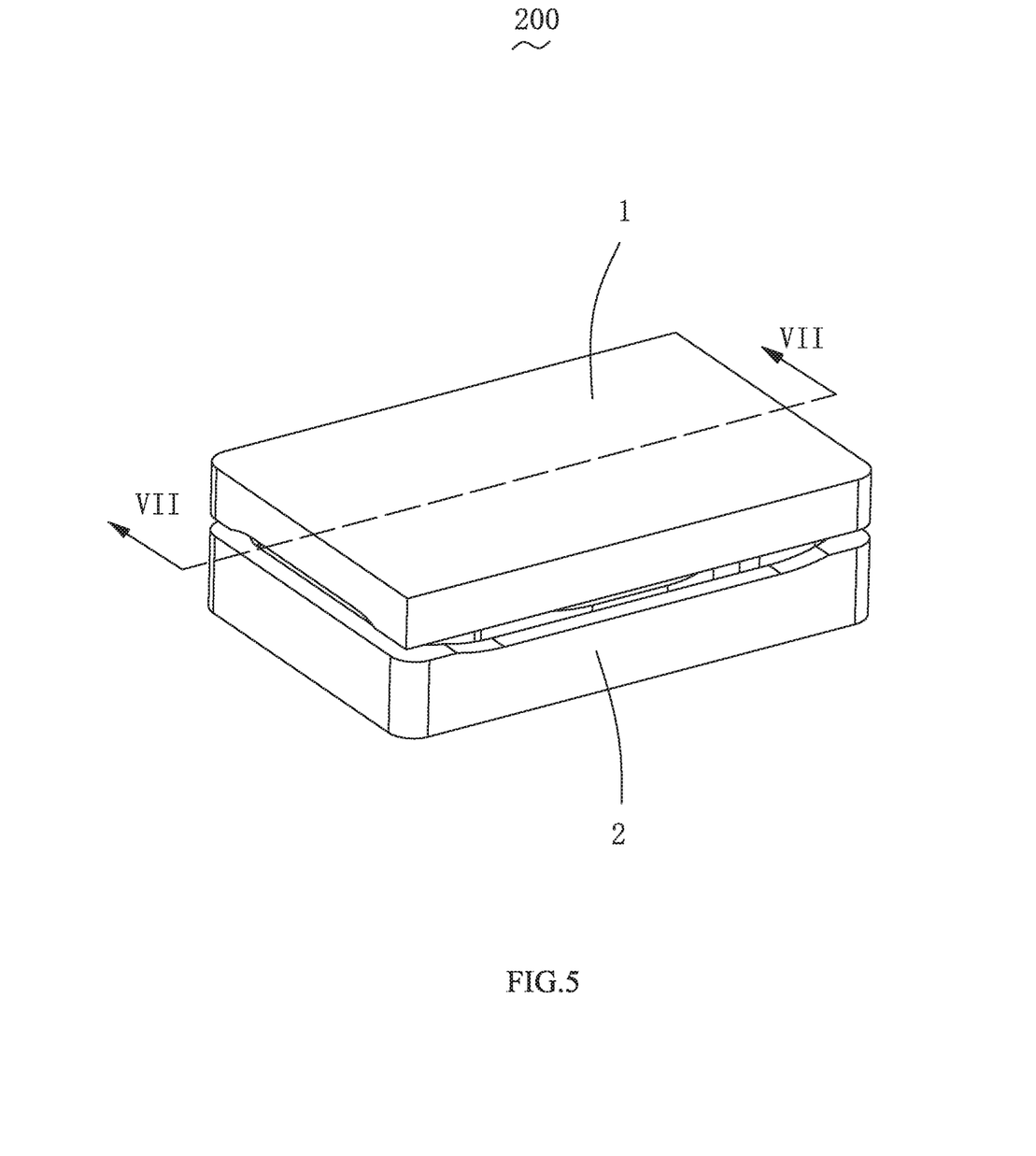
FIG. 5 is a schematic view of an exciter in accordance with a second exemplary embodiment of the present disclosure.
Figure 6:
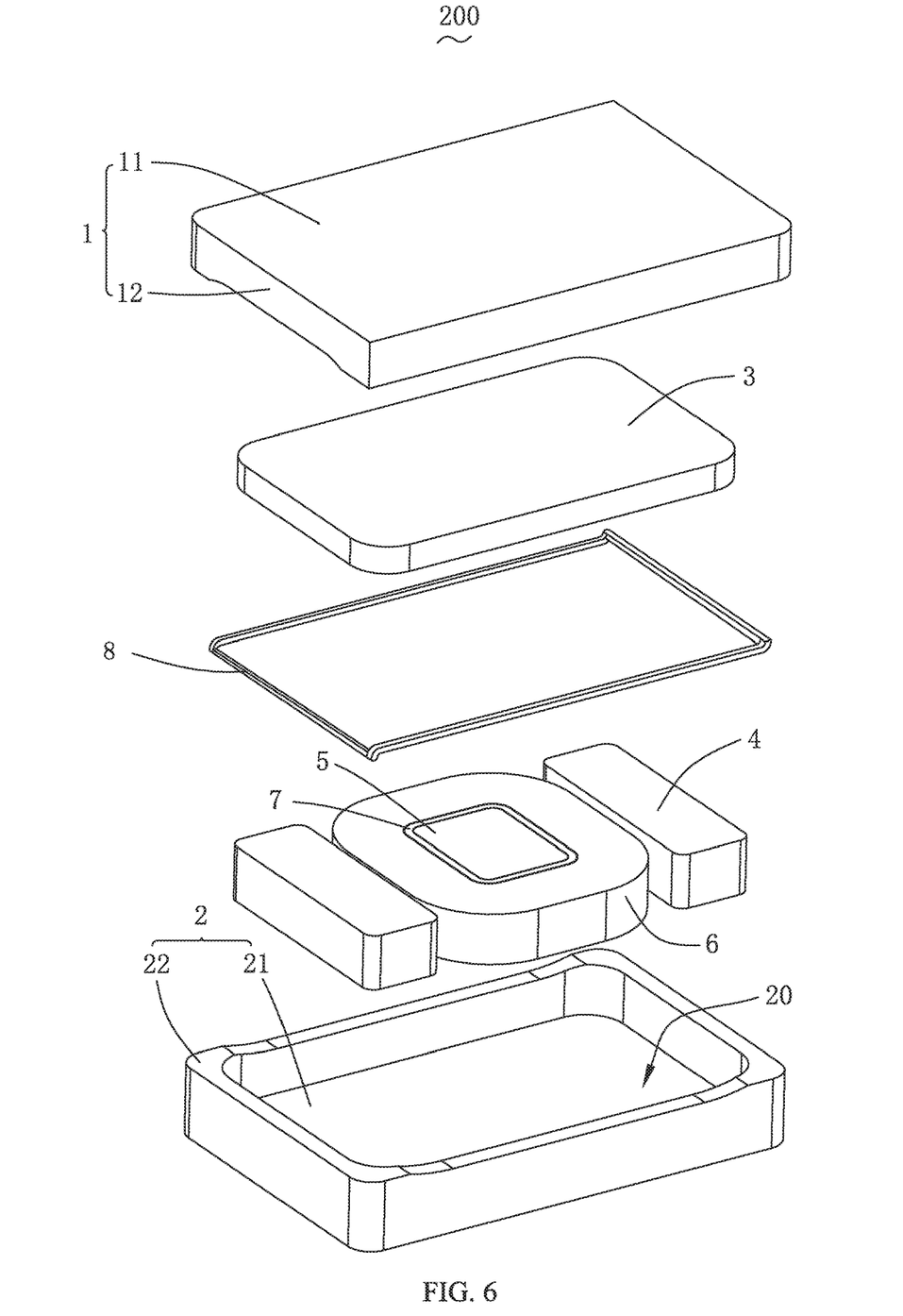
FIG. 6 is an exploded view of the exciter of FIG. 5.
Figure 7:
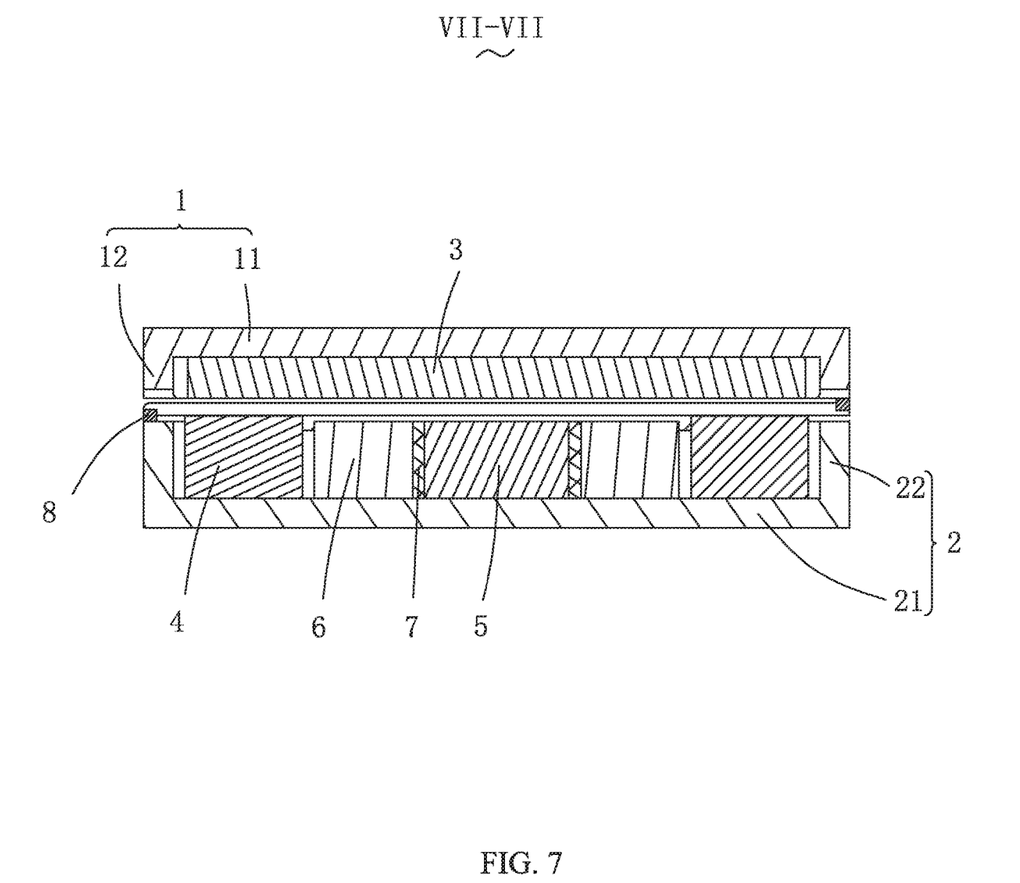
FIG. 7 is a cross-sectional view taken along line VII-VII of FIG. 5.

FIGS. 5-7 illustrate an exciter in accordance with a second exemplary embodiment of the present disclosure. The exciter of the second exemplary embodiment of the present disclosure is similar to the exciter of the first exemplary embodiment of the present disclosure except that the exciter 200 of the second exemplary embodiment further comprises an elastic member 8 connected between the first yoke 1 and the second yoke 2. The elastic member 8 is fixedly connected between the side wall 22 of the second yoke 2 and the first yoke 1.

Specifically, one end of the elastic plate 8 is fixed to the side wall 22 of the second yoke 2 and the other end is fixed to the side wall 12 of the first yoke 1. The repulsive force between the first magnetic member 3 and the second magnetic member 4 is slightly larger than the attractive force between the first magnetic member 3 and the magnetic core 5 and the second yoke 2, which reduces the damage to the screen caused by the attractive force. The elastic member 8 disposed between the first yoke 1 and the second yoke 2 facilitates to maintain the exciter 200 in a state of balanced force in the vibration direction, thereby improving the reliability of the exciter 200. Preferably, the elastic member 8 is ring-shaped. Preferably, the first side wall 12 of the first yoke 1 is aligned with the second side wall 22 of the second yoke 2 in the vibration direction. The outline of the elastic member 8 conforms to the outlines of the side wall 12 of the first yoke 1 and the side wall 22 of the second yoke 2.

Other components of the exciter 200 of the second exemplary embodiment are the same as that of the exciter 100 of the first exemplary embodiment and description is thus omitted.

Compared with the exciters of the related art, the exciter of the present disclosure applies a copper tube 7 which is sleeved on the magnetic core 5 and sandwiched between the magnetic core 5 and the coil 6. The copper tube 7 is capable of suppressing the high frequency impedance of the coil 6 and therefore improves the high frequency performance and the reliability of the exciter 100.

The above shows and describes the embodiments of the present disclosure. It is understandable that the embodiments above are only exemplary, and should not be interpreted as limiting the present disclosure, and those skilled in the art can make changes, modifications, replacements and deformations to the embodiments above within the scope of the present disclosure.

What is claimed is:

1. An exciter comprising:
    a first yoke having a first accommodation space with a first open end;
    a second yoke having a second accommodation space with a second open end which faces the first open end in a vibration direction;
    a first magnetic member accommodated in the first accommodation space;
    a magnetic core and a coil accommodated in the second accommodation space, the coil wound around the magnetic core;
    at least one second magnetic member accommodated in the second accommodation space, the at least one second magnetic member located at outside of the coil; and
    a copper tube wound around the magnetic core and sandwiched between the magnetic core and the coil.

2. The exciter of claim 1, wherein the at least one second magnetic member comprises two second magnetic members respectively located at opposite sides of the coil symmetrically.

3. The exciter of claim 2, wherein the two second magnetic members are magnetized in the vibration direction, and magnetized directions of the two second magnetic members are the same.

4. The exciter of claim 1, wherein the first magnetic member and the at least one second magnetic member are magnetized in the vibration direction, and magnetized directions of the first magnetic member and the at least one second magnetic member are reverse to each other.

5. The exciter of claim 1, wherein the first magnetic member and the at least one second magnetic member are permanent magnets.

6. The exciter of claim 1, wherein a projection of the at least one second magnetic member in the vibration direction at least partially overlaps with a projection of the first magnetic member in the vibration direction.

7. The exciter of claim 1, wherein the first yoke comprises a first end wall and a first side wall extending from the first end wall toward the second yoke; and
    the second yoke comprises a second end wall and a second side wall extending from the second end wall toward the first yoke, the magnetic core being fixed to the second end wall.

8. The exciter of claim 7, further comprising an elastic member connected and located between the first yoke and the second yoke in the vibration direction.

9. The exciter of claim 8, wherein the elastic member comprises a first end and a second end spaced from the first end in a direction perpendicular to the vibration direction, the first end being attached to the first side wall of the first yoke, the second end being attached to the second side wall of the second yoke.

10. The exciter of claim 7, wherein the first side wall is aligned with the second side wall with a gap in the vibration direction is formed between the first side wall and the second side wall such that the second open end is spaced from the first open end in the vibration direction.

11. The exciter of claim 1, wherein the elastic member is ring-shaped.

12. The exciter of claim 1, wherein the magnetic core is made of iron.

* * * * *